Nov. 17, 1931.    J. ARNOLD    1,831,797
PORTABLE SOUNDPROOF HOUSING FOR MOTION PICTURE APPARATUS
Filed July 9, 1929    2 Sheets-Sheet 1

Inventor
John Arnold
By Lyon & Lyon
Attorneys

Nov. 17, 1931.  J. ARNOLD  1,831,797
PORTABLE SOUNDPROOF HOUSING FOR MOTION PICTURE APPARATUS
Filed July 9, 1929  2 Sheets-Sheet 2
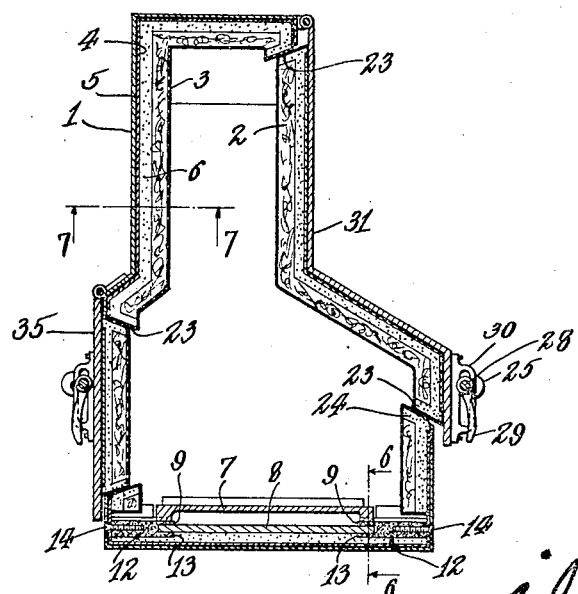
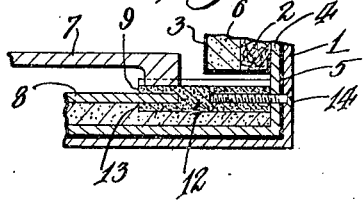
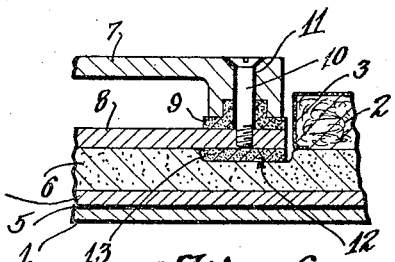
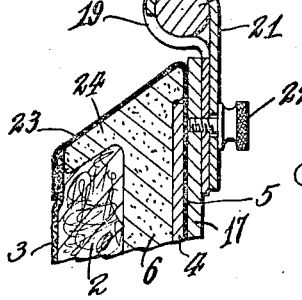
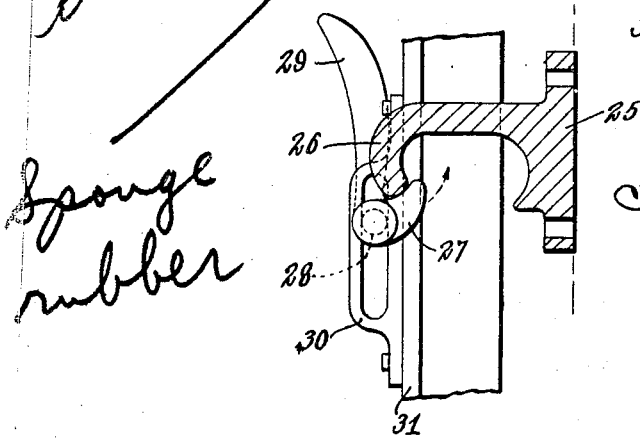
Inventor
John Arnold
By Lyon & Lyon
Attorneys Patented Nov. 17, 1931

1,831,797

UNITED STATES PATENT OFFICE

JOHN ARNOLD, OF LOS ANGELES, CALIFORNIA, ASSIGNOR TO METRO-GOLDWYN-MAYER CORPORATION, OF CULVER CITY, CALIFORNIA, A CORPORATION OF NEW YORK

PORTABLE SOUNDPROOF HOUSING FOR MOTION PICTURE APPARATUS

Application filed July 9, 1929. Serial No. 376,887.

This invention relates to portable housings for motion picture cameras and magazines, said housings being sound and vibration proof so as to permit the operation of motion picture cameras during the taking of sound pictures without causing the noises of the camera mechanism to interfere with the simultaneous sound recording. Preferably, the housings (called bungalows in the art) are only sufficiently large to enclose the camera and magazine used in connection therewith, so that the entire camera and housing may be mounted upon a suitable tripod for use.

Heretofore it has been thought necessary to enclose the entire camera, tripod and cameraman in a large sound proof chamber, resembling a refrigerator, the cameraman then operating the camera within the chamber through double plate-glass windows. Obviously, such large chambers cannot be moved readily and cannot be positioned properly. A camera located in a chamber of this sort cannot follow the action when it is necessary that the camera be swung through an angle of more than thirty degrees, and furthermore, it is difficult to ventilate a chamber of this sort, thereby causing the cameraman to work under considerable hardships.

An object of this invention is to disclose and provide a housing for motion picture cameras which is substantially sound and vibration proof. Another object is to disclose and provide a housing for motion picture cameras, said housing being portable in nature and adapted to closely fit around the camera.

Another object is to disclose and provide a housing provided with doors which may be readily closed and seal the openings made in the housing. Another object is to disclose and provide a portable sound proof housing for motion picture cameras, said housing containing a bed plate insulated from the rest of the housing.

Another object is to disclose and provide a housing provided with means for sealing openings therein, said sealing means being adapted to render the housing substantially sound and vibration proof.

Another object is to disclose a specific combination of elements and a particular construction applicable to portable housings for motion picture cameras and the like.

Other objects, uses and advantages of the invention and the detailed construction of the device disclosed herein will become apparent from the following detailed description of one preferred form of the invention.

In describing the invention, reference will be had to the appended drawings, in which:

Fig. 4 is a vertical section taken through the housing along plane 4—4 indicated in Fig. 1.

Fig. 5 is an enlarged vertical section of a portion of the device shown in Fig. 4.

Fig. 6 is an enlarged vertical section taken along plane 6—6 indicated in Fig. 4.

Fig. 7 is an enlarged section taken along line 7—7 of Fig. 4.

Fig. 8 is an enlarged vertical section through a hinge, the section being taken along line 8—8 of Fig. 3.

Fig. 9 is an enlarged elevation, partly in section, of a cam and lever latch adapted to be used in locking the doors of the device.

Figure 1:
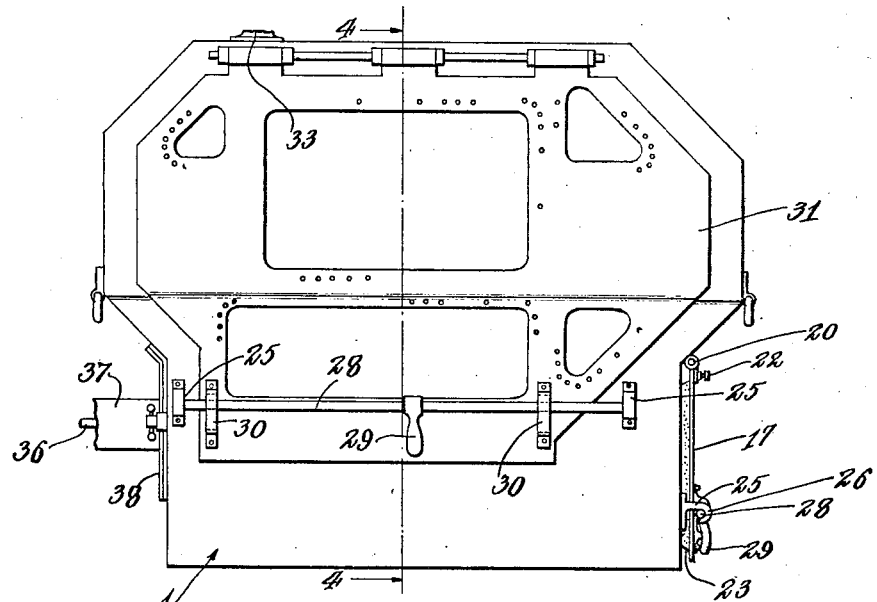
Fig. 1 is a side elevation of one form of portable housing embraced by this invention.

It is to be understood that the invention is not limited to the precise form shown in the appended drawings, as the size and shape and the location of doors, etc., of the housing may be materially changed without departing from the scope of the invention, such changes being influenced by the size and form and character of the motion picture camera which it is desired to use. The device illustrated in the drawings is adapted to snugly receive a Bell and Howell type of motion picture camera and magazine.

The housing comprises an outer metallic wall 1, preferably made of aluminum. All interior surfaces of the housing are preferably lined with a porous or fibrous sound absorbing material 2. This material may be hair-felt, mineral wool or any other porous or felted material capable of absorbing sounds. If desired, the interior surfaces of the sound absorbing material 2 may be covered with a fabric 3, said fabric being stitched or attached to the main body of the material 2 so as to retain the same in place. In order to prevent the passage of sound through the housing, a layer of metallic material 4 is preferably employed between the outer metallic housing 1 and the inner layer of sound absorbing material 2. The metallic sheet 4 is preferably very dense, and may consist of steel, lead or other heavy metal. Preferably, the sheet metal material 4 does not contact with the outer housing 1, but instead is separated therefrom by means of sheet rubber 5. Furthermore, a layer of sheet or sponge rubber 6 may be placed between the metallic sheet 4 and the sound absorbing material 2.

This general type of wall construction applies to all of the walls and doors of the housing, and the total thickness of such wall construction may preferably range from 2 to 3½ inches. A housing constructed in this manner is substantially sound proof and a vibrating and noisy piece of mechanism placed within such a housing does not produce audible sounds or vibrations exteriorly of the housing. As has been stated before, the housing follows the general contours of the mechanism which it is desired to employ therein, only sufficient room being left so as to permit the adjustment of the camera or other mechanism therein.

Preferably, the motion picture camera is firmly attached to a metallic base plate 7 which in turn rests upon a metallic anchor plate 8, rubber spacing means 9 being inserted between the anchor plate and the base plate. The anchor plate 8 may be connected to the base plate 7 in any suitable manner, as for example, by means of machine screws 10 threadedly engaged with the anchor plate 8, and passing through apertures in the spacing means 9 and in the anchor plate 8 but being insulated therefrom by means of soft rubber 11. The anchor plate 8 is preferably supported on the soft sponge rubber padding 6, whereas the spacing element 9 of resilient but fairly hard rubber has one finger of a spacing element 12 extending either along an entire edge of the anchor plate 8 or only along a portion thereof.

The spacing element 12 is preferably provided with a lower finger 13, the anchor plate 8 fitting into a groove separating the fingers 9 and 13 of the element 12. The element 12 preferably abuts the walls of the housing or the layer of sheet lead or other metal 4 and is maintained in position by means of machine screws or other means 14, passing through the layer of sheet rubber 5, the layer of lead 4 and into threaded engagement with the member 12. Similar spacing elements may grip the ends (instead of the sides) of the anchor plate 8 and be immovably retained within the housing by similar machine screws. In other words, a plurality of spacing elements 12 are provided which grip all four edges of the anchor plate 8 and maintain said anchor plate in position within the housing. The corners of the base plate 7 are attached to the anchor plate 8 as by means of the machine screws 10. It is to be understood that the base plate 7 may be provided with any suitable tongues, clamps or the like to facilitate the attachment of a motion picture camera thereto, and the adjustment of said camera thereon.

The housings described hereinabove may be provided with a plurality of doors. Preferably, the front end of the housing (illustrated in Fig. 3) is provided with a door 17 equipped with a window 18 consisting of one or more spaced sheets of glass. The camera photographs through said window 18, and as it is desirable that the lens of the camera be as close as possible to said window 18, provision has been made for rapidly changing the door 17 so that when lenses are changed which extend further away from or closer to the camera, the doors 17 may also be changed so as to provide a window which will still enable the lens to closely approach the window in said door.

Figure 3:
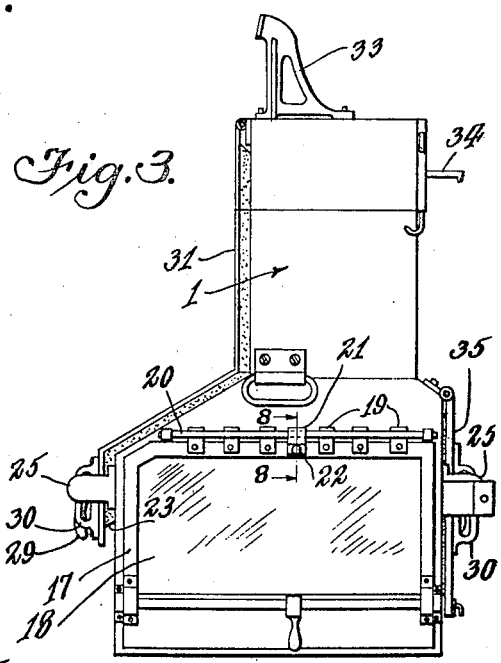
Fig. 3 is a front elevation of the housing shown in Fig. 1.

These means for rapidly changing the doors 17 comprise a plurality of fingers 19 attached to the upper edge of the door 17, said fingers 19 being adapted to engage with a pivot pin 20 attached exteriorly of said housing. In order to prevent the door 17 from falling off the hinge or pivot pin 20, one or more fingers 21 are provided, said fingers being adapted to engage with the hinge or pivot pin 20 but being curved in a reverse direction to the direction of curvature of the fingers 19. Preferably, only one finger 21 is required, as shown in Figs. 3 and 8, and said fingers 21 are detachably connected to the door 17 as by means of a screw and nut 22.

Inasmuch as the doors 17 open outwardly, the fingers 19 are maintained in contact with the pivot pin 20 by reason of the fingers 21 attached to the door, but if it is desired to remove the door, then the fingers 21 are released by operation of the nut 22, and as soon as finger 21 is removed, then the door may be swung outwardly thereby permitting the hinge or pivot pin 20 to come out of engagement with the finger 19.

Preferably, all doors of a housing cabinet of this character are provided with inclined meeting faces 23 and, furthermore, all doors are preferably made slightly larger than the apertures in the housing with which they are to cooperate. As shown in more detail in Fig. 8, the inclined meeting face 23 of a door may be covered with sheet rubber which overlaps the interior layer of sound absorbing material 2 and fabric 3. Furthermore, the sponge rubber layer 6 preferably extends substantially over the entire meeting face of the door, as indicated at 24. When a door of this character is pressed into place in its jamb (the seating face of the jamb also being constructed as indicated in Fig. 8), a sliding contact between the meeting faces is obtained so that by the exercise of pressure it is possible to closely compress the rubber at the meeting face and form a perfectly tight, sound proof joint or seat.

In order to permit the doors to be locked into position, a cam and lever type of latch is shown in the drawings. Lugs 25 are preferably attached to the housing exteriorly thereof and adjoining the doors. The lugs 25 are preferably provided with a downwardly curving finger 26 adapted to receive a cam 27. The cam 27 is preferably mounted on a rod 28 which may be provided with a handle or lever 29. The rod 28 may be loosely retained within straps 30 attached to the door, such as for example, the large door 31 in Fig. 1.

When it is desired to close the door, the end of cam 27 is caused to point into the cavity in the lugs 25 and to embrace the fingers of the lugs 27 as indicated in Fig. 9. A downward movement of the handle 29 will then cause the cam 27 to slip into the fingers 26 and to pivot on the interior surface of fingers 26 so as to cause the longitudinal axis of the rod 28 to move in an arc, as indicated by the arrow in Fig. 9. The rod 28, therefore, is partially rotated and simultaneously moved vertically, vertical movement of the rod 28 occurring in the strap or hanger 30 attached to the door 31. In this manner the door 31 is positively forced into position, thereby permitting a tight joint to be obtained at the meeting faces of the door and jamb, the rubber meeting face being compressed during the operation.

Figure 2:
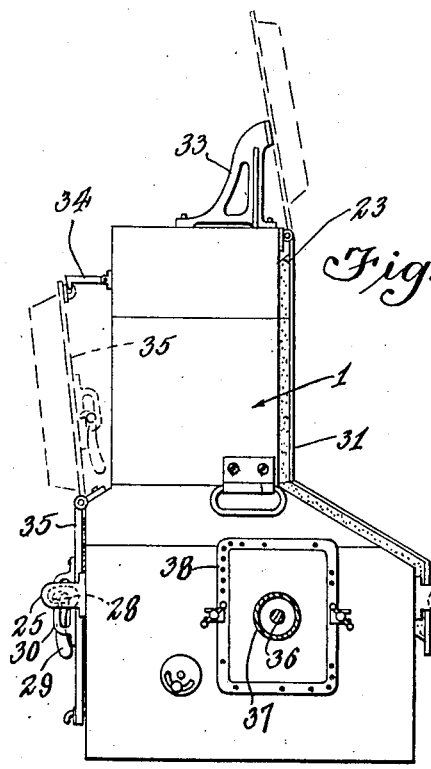
Fig. 2 is an end elevation of the housing shown in Fig. 1.

As shown in Fig. 2, the housing may be provided with a holder or support 33, against which the large door 31 may rest when in open position. Furthermore, a catch or latch 34 may be provided so as to hold the door 35 in open position when desired, as illustrated in Fig. 2. Means for supplying motive power to the camera within the housing may include a flexible cable 36 enclosed in sponge rubber and sheet rubber packing 37, said packing being attached to a small door 38 in the end of the housing, thereby permitting the supply of driving power to the camera, even said supply line being sound insulated.

A camera housing made in accordance with the hereinabove described invention may be attached to a tripod or camera support on a tripod, and be moved, tilted, adjusted and otherwise employed as in normal practice. The housing is substantially sound and vibration proof, so that the noise made by the shuttle movement, shutter and motor drive of a camera does not interfere with the taking and recordation of sound pictures. Furthermore, a device of this character permits the cameraman to work in the open air and permits him to move his camera freely without being restricted by the cumbersome, refrigerator-like cells in which they have been positioned prior to this invention.

The camera may be sighted by positioning a lens exteriorly of the housing and attached thereto, said lens being in alinement with the camera lens. By employing a sound insulated flexible motor drive cable, even the noise caused by the rotation of the cable may be obviated.

Those skilled in the art will recognize these and numerous other advantages, and the invention is not limited to the specific details of construction, arrangement of parts and other details described herein, but is of the scope of the appended claims.

What I claim is:

1. A portable vibration and sound proof housing for cameras, comprising an outer metallic housing, a lining of sound absorbing material in said housing, an opening in said housing aligned with a lens of a camera when a camera is disposed in the housing in operative position and a window in said housing provided with means for quickly detaching said window from said housing, said means including a hinge pin positioned exteriorly of said housing, a plurality of semi-circular fingers attached to said window and adapted to engage with said pin, and a finger detachably secured to said window, said last named finger being curved oppositely to the first named finger.

2. In a portable vibration and sound proof housing for cameras, the combination of an outer metallic housing, an interior lining of fibrous sound absorbing material, and a metallic sheet between said fibrous material and said outer housing, said metallic sheet being spaced from said housing by means of soft rubber.

3. In a portable vibration and sound proof housing for cameras, the combination of an outer metallic housing, an interior lining of fibrous sound absorbing material, and a metallic sheet between said fibrous material and said outer housing, said metallic material being spaced from said housing and from said fibrous material by layers of soft rubber.

4. In a portable vibration and sound proof housing for cameras, the combination of an outer metallic housing, an interior lining of fibrous sound absorbing material, a metallic sheet between said fibrous material and said outer housing, said metallic material being spaced from said housing by means of soft rubber, and a base plate for a camera within said housing, said base plate being separated from said outer metallic housing and inner metallic sheet by resilient, vibration absorbing material.

5. In a portable vibration and sound proof housing for cameras, the combination of a metallic outer housing lined with sound absorbing and sound resisting materials, an opening in said housing, a hinged door adapted to tightly fit into said opening, said door being larger than said opening, the meeting faces of said door and door opening being lined with soft rubber, and latch means adapted to force said door into closed position and form a gasket between said door and the jamb from said soft rubber.

6. In a portable vibration and sound proof housing for cameras, the combination of a metallic outer housing lined with sound absorbing and sound resisting material, an opening in the wall of said housing, the edges of said opening being adapted to form a jamb inclined to the plane of said wall, soft rubber covering said jamb, a door adapted to fit said opening, the edges of said door being covered with soft rubber, and cam and lever latch means adapted to force said door into closed position in said opening and compress the rubber in said jamb to form a tight joint.

7. In a portable vibration and sound proof housing for cameras, the combination of an outer metallic housing lined with sound absorbing and sound resisting material, a metallic anchor plate within said housing, resilient means for substantially positioning said anchor plate within said housing, a base plate adapted to receive a camera positioned in said housing, means for connecting said base plate with said anchor plate and resilient means separating said connecting means from said base plate.

8. In a portable sound and vibration proof housing for motion picture cameras, the combination of an outer metallic housing lined with sound absorbing material, a metallic anchor plate within said housing, resilient means for maintaining said anchor plate in position within said housing, said means comprising rubber fingers gripping the edges of said anchor plate, and means for connecting said fingers with the housing, and a base plate for cameras positioned within said housing and connected to said anchor plate.

9. In a portable vibration and sound proof housing for cameras, the combination of an outer metallic housing, a lining of sound absorbing material in said housing, a metallic anchor plate within said housing, resilient means for maintaining said anchor plate in position within said housing, a base plate adapted to receive a camera positioned within said housing, and means for resiliently connecting said anchor plate with said base plate, said means including apertures in said base plate, resilient spacing means between said base plate and anchor plate, connecting means in said apertures, said connecting means being attached to said anchor plate, and resilient means insulating said connecting means from said base plate.

10. In a portable vibration and sound proof housing for cameras, the combination of an outer metallic housing lined with sound absorbing material, an opening in said housing, a door lined with sound absorbing material adapted to fit into said opening, and latch means adapted to press said door into said opening, said latch means including straps attached to said door, a rod movable in said straps, a lever attached to said rod, cams attached to said rod, and cam receiving means attached to said housing.

11. In a portable, vibration and sound proof housing for cameras, the combination of an outer metallic housing, an interior lining of fibrous, sound absorbing material, a metallic sheet between said fibrous material and said outer housing, said metallic material being spaced from said housing by means of soft rubber, an opening in the wall of said housing, the edges of said opening being adapted to form a jamb inclined to the plane of said wall, soft rubber covering said jamb, a door adapted to fit said opening, the edges of said door being covered with soft rubber, and cam and lever latch means adapted to force said door to closed position in said opening and compress the rubber in said jamb to form a tight joint.

12. In a portable, vibration and sound proof housing for cameras, the combination of an outer metallic housing, an interior lining of fibrous, sound absorbing material, a metallic sheet between said fibrous material and said outer housing, said metallic material being spaced from said housing by means of soft rubber, a metallic anchor plate within said housing, resilient means for maintaining said anchor plate in position within said housing, said means comprising fingers gripping the edges of said anchor plate, means for connecting said fingers with the housing and a base plate for cameras positioned within said housing and connected to said anchor plate.

13. In a portable, vibration and sound proof housing for cameras the combination of an outer metallic housing, a lining of sound absorbing material in said housing, an anchor plate within said housing, a resilient means for maintaining said anchor plate in position and a base plate for cameras within said housing, said base plate being attached to said anchor plate but spaced therefrom by means of resilient vibration absorbing material.

Signed at Culver City, Calif., this 28th day of June, 1929.

JOHN ARNOLD.